C. SCHULTZ.
FARM GATE.
APPLICATION FILED SEPT. 27, 1909.
946,707.
Patented Jan. 18, 1910.
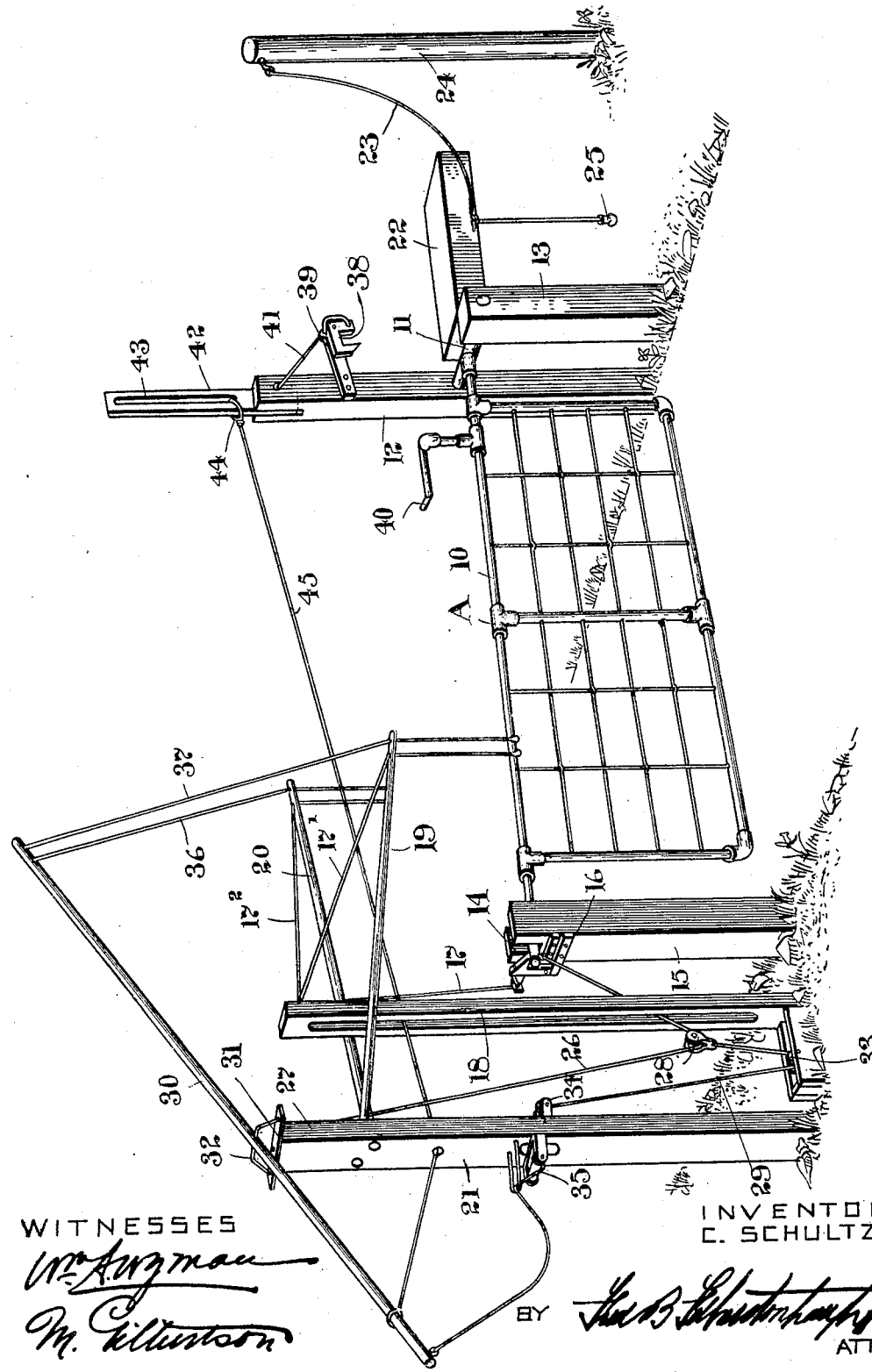
WITNESSES
INVENTOR
C. SCHULTZ
BY
ATTY

UNITED STATES PATENT OFFICE.

CHARLES SCHULTZ, OF CREMONA, ALBERTA, CANADA.

FARM-GATE.

946,707.

Specification of Letters Patent.  Patented Jan. 18, 1910.

Application filed September 27, 1909. Serial No. 519,836.

*To all whom it may concern:*

Be it known that I, CHARLES SCHULTZ, of Cremona, in the Province of Alberta, Canada, have invented certain new and useful Improvements in Farm-Gates, of which the following is a specification.

My invention relates to improvements in farm gates, and the objects of my invention are to provide a simple form of gate which may be operated with a minimum amount of power from an occupant of a vehicle on either side of the gate and which will be formed of simple parts so that it may be readily made and assembled in out-of-the-way places; and it consists essentially of the improved construction hereinafter described in detail in the accompanying specifications and drawings.

The drawings show the perspective view of the gate in closed position.

Referring to the drawings, A represents the gate proper of any suitable form or material supported in such a manner that it is free to swing in a vertical plane, this being accomplished in the embodiment illustrated, by connecting the upper bar 10 of the gate to the transversely extending shaft 11 journaled in standards 12 and 13. The opposite end of the bar 10 extends in a slot 14 at the top of the standard 15, being normally located therein by a pivoted dog 16 gravity held in locked position, but adapted to be tilted therefrom by a cord 17 connected to one side of the same and extending through a suitable eyelet on the top of a post 18 and being there formed with two branches 17' and 17², which extend through the opposite ends of divergent arms 19 and 20 supported from a post 21 and the ends of the said arms extending adjacent to the position of a vehicle before it enters the gate on either side.

To raise the gate to open position, a large weight 22 is provided secured to an extension of the bar 10, the weight always tending to move the gate to vertical position and causing the gate to tilt to this position as soon as the dog 16 is released.

To limit the movement of the gate in either position, a cord 23 is provided, connected at its center to the gate and its opposite ends to a post 24 and to a pin 25 respectively.

The improved means which I have provided for restoring the gate to normal position comprise a cord 26 connected at one end to the gate and at the other end to the top of a post 27, the said cord having a pulley 28 thereon, which is connected by means of a cord 29 with the end of a tiltable lever 30, the said lever having a swiveling support on top of the post 27.

The form of swiveling support illustrated comprises a plate 31 pivoted to the top of the post and having a bracket 32 thereon, to which the lever is pivotally attached. The cord 29 extends over suitable rollers 33, 34 and 35 disposed in such a manner as to cause it to pull the pulley 29 downwardly when the outer end of the lever 30 is depressed. The depression of the end of the lever is effected through the medium of cords 36 and 37 which extend through apertures in the end of the arms 19 and 20.

To lock the gate in open position, a pivoted dog 38 is provided, supported from a bracket 39 on the post 12 and adapted to automatically engage a projecting arm 40 on the gate when the gate is raised to vertical position, the dog being normally gravity held in locked position and being adapted to be released by means of a cord 41 connected to a tiltable lever 42 on the top of the post 12, which lever has a longitudinal slot 43 therein, in which a strap 44 slides the said strap being connected by a cord 45 with the lever 30, whereby when the lever 30 is tilted, the lever 42 will be tilted to release the dog 38.

Having thus described the various parts of my gate, I will briefly point out the method of operation of the same.

When the occupant of a vehicle or a pedestrian desires to open the gate, he will pull either of the cords 17' or 17², which releasing the dog 16, will permit the gate to tilt upwardly under the action of the weight 22, finally being held in raised position by the dog 38. On his passing through the gate and desiring to lower the same again, the pedestrian or occupant of the vehicle will pull either of the cords 36 or 37, which will tilt the lever 30, tightening the cords, pulling the pulley 28 downwardly and bringing the gate again to horizontal position, where it will be engaged and locked by the dog 16.

It will be observed that the provision of the pulley 28 reduces the distance through which it is necessary to tilt the lever 30, in order to return the gate to normal position. For a given movement of the pulley the gate is tilted twice the distance.

As many changes could be made in the above construction and many apparently widely different embodiments of my invention within the scope of the claims could be made without departing from the spirit or scope thereof, it is intended that all matter contained in the accompanying specifications and drawings, shall be interpreted as illustrative and not in a limiting sense.

What I claim as my invention is:

1. A farm gate comprising a tiltable counter-balanced gate, a tiltable lever, means for tilting the lever from opposite sides of the gate, a cord extending from a fixed support to the end of the gate, a pulley on the cord, means connecting the pulley with the end of the lever, whereby when the lever is tilted, the pulley will be actuated to tighten the cord and bring the gate to horizontal position.

2. A farm gate comprising a tiltable counter-balanced gate, a tiltable lever having a swiveling support, means for tilting the lever from opposite sides of the gate, a cord extending from a fixed support to the end of the gate, a pulley on the cord, means connecting the pulley with the end of the lever, whereby when the lever is tilted, the pulley will be actuated to tighten the cord and bring the gate to horizontal position.

3. A farm gate comprising a tiltable counter-balanced gate, a tiltable lever, means for tilting the lever from opposite sides of the gate, a cord extending from a fixed support to the end of the gate, a pulley on the cord, means connecting the pulley with the end of the lever, whereby when the lever is tilted the pulley will be actuated to tighten the cord and bring the gate to horizontal position, means for locking the gate in open and closed position and means for releasing the locking means from opposite sides of the gate.

4. A farm gate comprising a tiltable counter-balanced gate, a tiltable lever, means for tilting the lever from opposite sides of the gate, a cord extending from a fixed support to the end of the gate, a pulley on the cord, means connecting the pulley with the end of the lever, whereby when the lever is tilted, the pulley will be actuated to tighten the cord and bring the gate to horizontal position, means for locking the gate in open position and means operated by the tilting of the lever for releasing the locking means.

5. A farm gate comprising a tiltable counter-balanced gate, a tiltable lever, means for tilting the lever from opposite sides of the gate, a cord extending from a fixed support to the end of the gate, a pulley on the cord, means connecting the pulley with the end of the lever, whereby when the lever is tilted, the pulley will be actuated to tighten the cord and bring the gate to horizontal position, a pivoted locking dog adapted to hold the gate in open position, a tiltable slotted lever operatively connected to the same, a strap slidable in the slot, a cord connecting the strap with the tiltable lever, whereby when the first mentioned lever is tilted it will tilt the slotted lever to release the dog.

6. A farm gate comprising a tiltably supported gate having a weight operatively connected thereto and adapted to tend normally to raise the same to vertical position, a post, a swivel on top of the post, a lever centrally fulcrumed to the swivel, a cord extending from the post to the end of the gate, a pulley on the cord, a cord connecting the pulley with the end of the lever, a plurality of pulleys suitably guiding the last mentioned cord in such a manner that when the lever is tilted, the said pulley will be moved downwardly, a locking dog normally holding the gate in horizontal position, means operable from opposite sides of the gate for releasing the dog, means for locking the gate in open position and means operable from opposite sides of the gate for tilting the lever and for releasing the means which lock the gate in open position.

In witness whereof I have hereunto set my hand in the presence of two witnesses.

CHARLES SCHULTZ.

Witnesses:
JOSEPH E. STAUFFER,
D. C. CORBITT.